United States Patent [19]
John

[11] Patent Number: 4,808,032
[45] Date of Patent: Feb. 28, 1989

[54] THRUST PIPE

[75] Inventor: Hans-Jürgen John, Hamburg, Fed. Rep. of Germany

[73] Assignee: Meyer & John GmbH & Co. Tief- und Rohrleitungsbau, Hamburg, Fed. Rep. of Germany

[21] Appl. No.: 55,217

[22] Filed: May 29, 1987

[30] Foreign Application Priority Data

May 30, 1986 [DE] Fed. Rep. of Germany ....... 3618334

[51] Int. Cl.$^4$ ............................................. F16L 1/00
[52] U.S. Cl. ................................ 405/184; 254/29 R; 285/288; 405/135; 138/175
[58] Field of Search ............ 405/184, 145, 135, 250, 405/251, 252, 150; 254/29 R; 138/176, 175, 140; 285/230, 288

[56] References Cited

U.S. PATENT DOCUMENTS

| | | | |
|---|---|---|---|
| 1,770,180 | 7/1930 | Mitchel | 285/288 |
| 1,847,814 | 3/1932 | Byrne | 405/252 |
| 2,348,477 | 5/1944 | Jenkins | 138/176 X |
| 2,662,555 | 12/1953 | Hirsh | 285/288 |
| 3,352,120 | 11/1967 | Pelzer | 405/252 |
| 3,825,037 | 7/1974 | Keyser | 138/175 |
| 4,552,485 | 11/1985 | Hammer | 405/135 X |

*Primary Examiner*—Dennis L. Taylor
*Attorney, Agent, or Firm*—Nixon & Vanderhye

[57] ABSTRACT

Thrust pipe for disposition in a passage in the ground by advance of the pipe axially through the passage includes a plurality of pipe segments disposed in end-to-end relation one to the other. Each pipe segment includes an inner pipe section having a diametrically enlarged end for telescopically receiving the opposite end of an adjacent inner pipe section. The pipe segments each include an outer pipe section, substantially enveloping a corresponding inner pipe section. The outer surface of the pipe segments is smooth and substantially continuous. Each outer pipe section at one end terminates short of the end of the corresponding inner pipe seciton and is spaced from the outer pipe section of the adjacent pipe segment whereby compressive loadings from thrusting the pipe axially through the passage are carried by the inner pipe sections and not be the outer pipe sections.

25 Claims, 1 Drawing Sheet

THRUST PIPE

BACKGROUND AND SUMMARY OF THE INVENTION

The present invention relates to a thrust pipe for laying pipe in the ground wherein the pipe is thrust axially through a prepared passage through the ground and particularly relates to the construction of the thrust pipe whereby advance of the pipe through the passage is facilitated.

Thrust pipes are old and well known and typically comprise a plurality of pipe segments arranged end-to-end with each segment having an outer pipe section which envelops or surrounds an inner pipe section. The outer pipe section is often formed of high-strength concrete and carries substantially the entirety of the axial compressive loads when the pipe segments are thrust forwardly in a axial direction along the passage. The outer pipe section carries a tool in advance of the pipe to loosen the ground in order to facilitate axial advance of the thrust pipe behind the tool. Thus, all axial compressive forces are transmitted from the tool through the outer pipe. This necessitates the formation of the outer pipe of high-strength materials. The inner pipe section conventionally serves as an internal liner for the outer pipe section and creates a seal against the escape of liquids or gases through the outer pipe section. Only very minimal compressive loadings are carried by the inner pipe.

The outer pipe sections of thrust pipes have also been formed of metal. However, it will be appreciated that the joints formed between adjacent outer metal pipe sections invariably require the formation of outwardly extending projections or shoulders in order to effect proper jointure of the adjacent pipe sections. Those projections or shoulders about the outer circumference of the pipe joints hinder and inhibit the axial advance of the pipe as the pipe passes through the surrounding soil of the passage. While it has been proposed to excavate a passage in front of the thrust pipe substantially diametrically larger than necessary to accommodate the diameter of the pipe, that leaves an annular cavity about the pipe when the latter is in place. As the cavity is filled by the surrounding soil, this settlement process causes subsidence of the ground surface above the pipe.

According to the present invention, thrust pipe is provided which is comprised of a plurality of pipe segments disposed in end-to-end axial relation one to the other wherein the pipe has substantial capacity for carrying compressive loads and a smooth, substantially continuous, outer surface without any outwardly protruding projections or shoulders which would inhibit the advance of the pipe through the passage. The present pipe is constructed to substantially fill the passage as it is advanced axially and enables the use of ductile cast pipes as thrust pipes. To accomplish that, the present invention provides, in contrast to the prior art discussed above, a plurality of pipe segments comprised of inner and outer pipe sections wherein the inner pipe sections are constructed of a material capable of carrying substantially the entirety of the axial compressive loading as the pipe segments are thrust forwardly and axially along the passage. By forming the inner pipe sections of such material, they may be advantageously formed of ductile, standard cast pipes with mutually supportive parts which project radially outwardly of the outer diameter of the inner pipe sections. For example, one end of each inner pipe section may be diametrically enlarged to telescopically receive the adjacent end of an inner pipe section whereby axial compressive forces may be readily transmitted in the axial direction from one pipe section to the next.

Each pipe segment also has an outer pipe section which terminates a distance short of one end of the corresponding inner pipe section. Each outer pipe section is axially spaced from the next adjacent opposite end of an adjacent outer pipe section. In this manner, when the pipe segments are assembled in end-to-end relation and axial thrust is applied, the compressive loading, as the pipe segments are advanced through the passage, is carried substantially entirely by the abutting inner pipe sections, while the outer pipe sections carry little or none of the compressive loadings due to the annular clearance spaces between the outer pipe sections. Stated somewhat differently, the present invention provides a reverse-type of construction than the prior art thrust pipe construction noted above in that the inner metallic pipe sections carry the compressive loading in the present invention, whereas the outer sections carry the compressive loading in the prior art.

Additionally, in accordance with the present invention, the outer surface of the outer pipe sections is of substantially constant diameter throughout the length of the pipe, and this facilitates axial advance of the pipe segments through the passage. That is, without any radially outwardly projecting protrusions or shoulders along the outer surface of the pipe segments, the passage through which the pipe segments pass axially may be accurately formed to the dimensions of the thrust pipe. In that manner, the thrust pipe completely fills the prepared passage as it is advanced axially and any previous need to form a larger cavity with consequent undesirable soil subsidence is eliminated. It is thus possible to use ductile cast pipes with mutually supporting, radially outwardly projecting parts at their joints, which provide a pressure-tight seal therebetween, while at the same time affording a substantially continuous, smooth outer surface to the outer pipe sections. Each outer pipe section has, of course, a larger diameter outer surface than the maximum diameter of the mutually supporting parts of the inner pipe sections at their joints. Thus, according to the present invention, it is possible to use ductile cast pipes as thrust pipes for laying by means of a thrusting process which has heretofore not been possible because of the projections of connecting parts for adjacent pipe sections. (Ductile cast pipes, known as ductile iron in the United States, are cast pipes which are treated by generating a certain directional position of the graphite particles within the cast iron.) In accordance with the present invention, each outer pipe section, therefore, can be made from lightweight concrete of limited strength inasmuch as it need not carry any of the compressive loadings resulting from axially advancing the pipe segments through the passage. Additionally, the present invention makes possible the formation of outer pipe sections from a foam plastic material. This may be particularly appropriate if thermal insulation is desired, for example, in the case of long-distance heating ducts.

An additional advantage of the present invention resides in the capability to use the form work or mold used to form the outer pipe sections as part of the pipe segments laid in the passage. That is, the mold or form used to form the foam plastic about the inner pipe section may be retained on the pipe segments so that, in use, the mold or form surrounds both the outer and inner pipe sections when the thrust pipe is disposed in the passage. Furthermore, the inner pipe sections may be covered with an anti-corrosion layer or the pipe sections per se may be formed from a corrosion-resistant metal.

Accordingly, in accordance with a preferred embodiment of the present invention, there is provided a thrust pipe for disposition in a passage in the ground by advance of the pipe axially through the passage comprising a plurality of thrust pipe segments disposed in end-to-end relation one to the other, each thrust pipe segment including an inner pipe section and an outer pipe section substantially enveloping the inner pipe section. Each of the inner pipe sections is formed of a material capable of carrying substantially the entirety of the axial compressive forces on the corresponding pipe segment as the pipe segments are thrust forwardly and axially along the passage. Additionally, each outer pipe segment has its outer pipe section terminating at one end short of the corresponding end of its inner pipe section. In a preferred form of the present invention, each inner pipe section has at one end a radially enlarged portion for telescopically receiving the opposite end of the adjacent inner pipe section whereby adjacent inner pipe sections may be sealed one to the other. With this configuration, the outer surfaces of the pipe segments are substantially the same diameter throughout their lengths whereby the pipe segments present a substantially constant diameter outline to the passage as the pipe is axially advanced within the passage.

In a further aspect of the present invention, the opposed adjacent ends of the outer pipe sections are spaced one from the other whereby axial transmission of compressive forces from one outer pipe section to the next outer pipe section as the pipe segments are thrust forwardly and advanced axially into the passage is substantially precluded.

In accordance with another aspect of the present invention, there is provided a thrust pipe for disposition in a passage in the ground by advance of the pipe axially through the passage comprising a thrust pipe segment including an inner pipe section and an outer pipe section about said inner pipe section, said inner pipe section being formed of a material capable of carrying substantially the entirety of the axial compressive forces on the corresponding pipe segment as the pipe segment is thrust axially along the passage, the pipe segment having its outer pipe section terminating at one end short of the corresponding end of its inner pipe section, the opposite end of said inner pipe section having a radially enlarged portion providing a radially enlarged interior pipe surface, the outer surface of said outer pipe section being of substantially constant diameter throughout its length whereby the pipe segment presents a substantially constant diameter outline to the passage as the pipe is axially advanced through the passage.

Accordingly, it is a primary object of the present invention to provide a novel and improved thrust pipe construction enabling the use of ductile cast pipe sections to be readily and easily laid in a passage without soil subsidence, wherein the inner pipe sections formed of the ductile cast material carry substantially the entirety of the compressive loading and the outer pipe sections covering the inner pipe sections form a substantially continuous, smooth surface throughout the length of the thrust pipe.

These and further objects and advantages of the present invention will become more apparent upon reference to the following specification, appended claims and drawings.

BRIEF DESCRIPTION OF THE DRAWING FIGURES

FIG. 1 is an axial cross-sectional view through a plurality of thrust pipe segments constructed in accordance with the present invention; and FIG. 2 is a view similar to FIG. 1 illustrating a further embodiment of the invention.

DETAILED DESCRIPTION OF THE DRAWING FIGURES

Reference will now be made in detail to the present preferred embodiment of the invention, an example of which is illustrated in the accompanying drawings.

Figure 1:
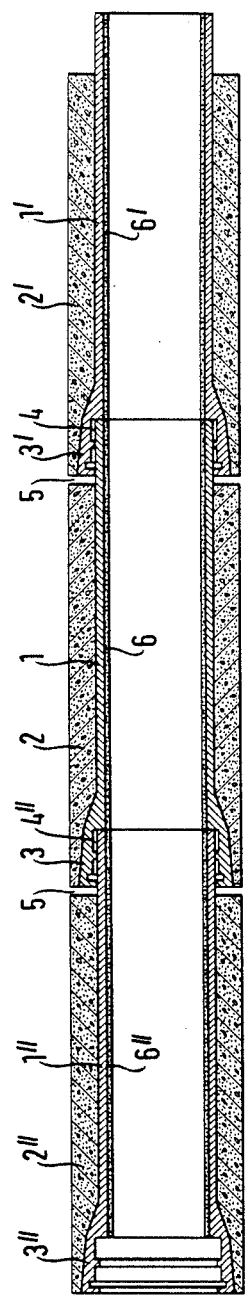

Referring now to FIG. 1, there is illustrated a thrust pipe or pipe string comprised of a plurality of pipe segments generally designated PS, there being illustrated three such pipe segments PS. It will be appreciated, of course, that any number of pipe segments may be connected end-to-end as shown to form the thrust pipe hereof. The three thrust pipes illustrated have the same reference characters, differing solely by the addition of a ' and " to indicate specific pipe segments. Because the pipe segments are identical one to the other, only the central pipe segment will be described, except as necessary to describe the joints between adjacent pipe segments.

Each pipe segment PS is comprised of an inner pipe section 1 and an outer pipe section 2. Inner pipe section 1 is preferably formed of a ductile cast pipe having a first end (the lefthand end as illustrated in FIG. 1) with a radially enlarged pipe section portion 3 for telescopically receiving the opposite or second end of the adjacent inner pipe section 1". As illustrated, the second end of each inner pipe section is a continuation of the main part of the pipe section without change in diameter. The radially outwardly projecting portion 3, however, extends radially outwardly beyond the outer surface of the main portion of the inner pipe sections 1. Thus, the first end of each inner pipe section 1 with the radial enlargement 3 telescopically receives the second end of the next adjacent inner pipe section 1". Enlargement 3 carries a pair of axially adjacent annular grooves 4. The grooves may be provided with sealing sleeves or gaskets to effectively seal the inner pipe sections one to the other.

Surrounding each inner pipe section 1 is an outer pipe section 2, the outer diameter of which is constant throughout its length and larger than the maximum diameter of the radially enlarged portion 3 of the inner pipe sections 1. Thus, outer pipe section 2 forms a substantially continuous, smooth, cylindrical outer surface about inner pipe section 1. However, from a review of FIG. 1, it will be appreciated that the outer pipe section 2 terminates at one end in a diametrical plane also containing the end of the radially enlarged portion 3, while at its opposite end, it terminates short of the corresponding opposite or second end of inner pipe section 1. Thus, when the pipe segments are disposed in end-to-end relation one to the other and the second end of the inner pipe section 1" is received within the radially enlarged portion 3 of the first end of the adjacent inner pipe section 1, the setback end of the outer pipe section 2" is spaced from the end of the adjacent outer pipe section 2.

That is, an annular space 5 is provided between the opposed ends of the outer pipe sections when the pipe segments are joined one to the other. In this manner, the axial thrust for compressive loading of the pipe segments cannot be transmitted through the outer pipe sections 2. Rather, the axial compressive loading is transmitted or carried by the inner pipe sections through the telescoped joints thereof. Stated somewhat differently, and with respect to each thrust pipe segment, the length of the outer pipe section is less than the length of the inner pipe section by a dimension in excess of the axial extent of the radial enlargement at the opposite end of the inner pipe section.

Outer pipe sections 2 can be formed of a low-strength concrete or foam plastic material inasmuch as they do not carry compressive loading. The annular clearances 5 between the outer pipe sections of adjoining pipe segments may be filled with a permanent elastic material, particularly if the thrust pipe is to be thermally insulated. Thus, little or no compressive loading is carried by the outer pipe sections.

The inner pipe sections are preferably formed of metal. An anti-corrosive layer 6 may be formed on the interior surface of the metal inner pipe sections or they may be formed per se of an anti-corrosion material.

Figure 2:
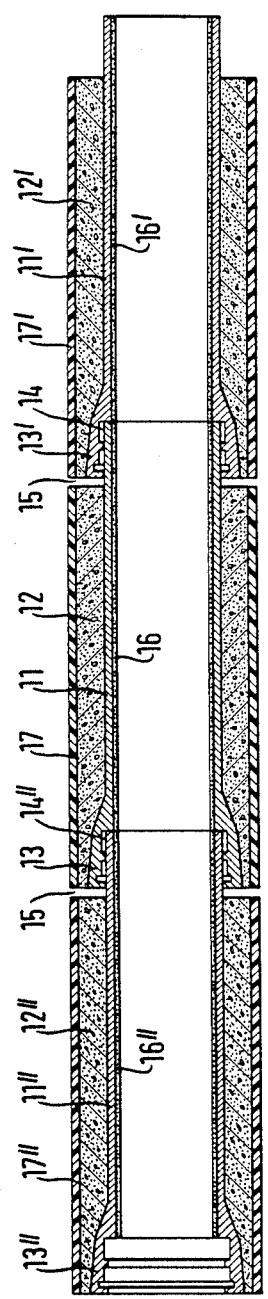

With reference to FIG. 2, there is illustrated a further embodiment of the present invention wherein like reference numerals, increased by 10, are applied to like parts. In this embodiment, a jacket 17 surrounds outer pipe sections 12. Jacket 17 may comprise the mold or form by which the outer pipe sections 12 are formed. For example, if each outer pipe section is formed of a foam plastic material, the form or mold 17 may be used in the production of the outer pipe section 12. Such mold or form may be made, for example, from PVC or may comprise a thin metal pipe. As illustrated, the outer surface of the jacket or mold 17 is substantially continuous, smooth and of like diameter throughout its length.

It will be appreciated that, in using the thrust pipe hereof, the tool in advance of the first pipe segment prepares the passage for the following pipe segments. Pipe segments are therefore thrust forwardly and axially through the passage prepared by the tool, the pipe segments transmitting the thrust forwardly to the tool to advance the latter through the unprepared ground. The thrust pipe is readily and easily inserted through the prepared passage inasmuch as there are no radial projections or protrusions which inhibit such passage. Additionally, the compressive loading resulting from the axial thrust is carried substantially entirely by the inner pipe sections, whereas the outer pipe sections carry substantially none of the compressive loading. Further, because of the smooth, substantially continuous nature of the outer surface of the thrust pipe, the diameter of the prepared passage may correspond to the diameter of the pipe whereby, upon thrusting the pipe through the passage, little or no soil subsidence occurs at the ground surface overlying the pipe.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Thrust pipe for disposition in a passage in the ground by advance of the pipe axially through the passage comprising:
    a plurality of thrust pipe segments disposed in end to end relation one to the other, each thrust pipe segment including an inner pipe section and an outer pipe section about said inner pipe section;
    each of said inner pipe sections having adjoining ends in abutting relation one with the other;
    each said inner pipe section being formed of a material capable of carrying substantially the entirety of the axial compressive loading the corresponding pipe segment as the pipe segments are thrust axially along the passage with the outer pipe section thereof carrying substantially none of such loading; and
    each said pipe segment having its outer pipe section terminating at one end short of the corresponding end of its inner pipe section.

2. Thrust pipe according to claim 1 wherein each said inner pipe section is comprised of a ductile cast pipe.

3. Thrust pipe according to claim 1 wherein each of said inner pipe sections has at one end a radially enlarged portion for telescopically receiving the opposite end of the adjacent inner pipe section.

4. Thrust pipe according to claim 3 including means disposed within said radially enlarged pipe section portion for sealing the adjacent pipe sections one to the other.

5. Thrust pipe according to claim 1 wherein the outer surfaces of said pipe segments are of substantially the same diameter throughout their lengths whereby said outer pipe segments present a substantially constant diameter outline to the passage as the pipe is axially advanced within the passage.

6. Thrust pipe according to claim 1 wherein opposed ends of adjacent outer pipe sections are spaced one from the other whereby axial transmission of axial compressive loading from one outer pipe section to the next outer pipe section as the pipe segments are thrust forwardly and advanced axially into the passage is substantially precluded.

7. Thrust pipe according to claim 1 wherein said outer pipe sections are formed of concrete.

8. Thrust pipe according to claim 1 wherein said inner pipe sections are formed of metal.

9. Thrust pipe according to claim 1 wherein said outer pipe sections are formed of a layer of plastic foam.

10. Thrust pipe according to claim 1 wherein the inner face of said inner pipe sections is comprised of an anti-corrosion layer.

11. Thrust pipe according to claim 1 wherein said outer pipe sections are surrounded by a mold by which the outer pipe sections are formed, said mold being carried with said pipe segments upon disposition thereof in the passage.

12. Thrust pipe for disposition in a passage in the ground by advance of the pipe axially through the passage comprising:
    a plurality of thrust pipe segments disposed in end to end relation one to the other, each thrust pipe segment including an inner pipe section and an outer pipe section substantially enveloping said inner pipe section;
    each of said inner pipe sections having adjoining ends in abutting relation one with the other;
    each said inner pipe section being formed of a material capable of carrying substantially the entirety of the axial compressive loading on the corresponding pipe segment as the pipe segments are thrust axially along the passage with the outer pipe section thereof carrying substantially none of such loading; and the opposed ends of adjacent outer pipe sections being spaced one from the other whereby transmission of axial compressive loading from one outer pipe section to the next outer pipe section as the pipe segments are thrust axially into the passage is precluded.

13. Thrust pipe according to claim 12 wherein each said inner pipe section is comprised of a ductile cast pipe.

14. Thrust pipe according to claim 12 wherein each of said inner pipe sections has at one end a radially enlarged portion for telescopically receiving the opposite end of the adjacent inner pipe section.

15. Thrust pipe according to claim 12 including means disposed within said radially enlarged pipe section portion for sealing the adjacent pipe sections one to the other.

16. Thrust pipe according to claim 12 wherein the outer surfaces of said pipe segments are of substantially the same diameter throughout their lengths whereby said outer pipe segments present a substantially constant diameter outline to the passage as the pipe is axially advanced within the passage.

17. Thrust pipe for disposition in a passage in the ground by advance of the pipe axially through the passage comprising:
a plurality of thrust pipe segments disposed in end to end relation one to the other, each thrust pipe segment including an inner pipe section and an outer pipe section substantially enveloping said inner pipe section;
each of said inner pipe sections having adjoining ends in abutting relation one with the other;
each pipe segment having its outer pipe section terminating at a first end short of the corresponding first end of its inner pipe section;
each said inner pipe section, at a second end thereof, having a radially enlarged portion for telescopically receiving the first end of the adjacent inner pipe section;
the outer surface of said pipe segments being of substantially the same diameter throughout their lengths whereby said outer pipe segments present a substantially constant diameter outline to the passage as the pipe is axially advanced within the passage;
the opposed ends of adjacent outer pipe sections being spaced one from the other whereby transmission of axial compressive loading from one outer pipe section to the next outer pipe section as the pipe segments are thrust axially into the passage is precluded.

18. Thrust pipe according to claim 17 wherein the first end of each said outer pipe section lies contiguous to the end of the radially enlarged portion at the second end of an adjacent inner pipe section.

19. Thrust pipe according to claim 17 wherein said outer pipe sections are formed of concrete and said inner pipe sections are formed of metal.

20. Thrust pipe according to claim 17 wherein said outer pipe sections are formed of a layer of plastic foam and said inner pipe sections are formed of metal.

21. A thrust pipe for disposition in a passage in the ground by advance of the pipe axially through the passage comprising:
a thrust pipe segment including an inner pipe section and an outer pipe section about said inner pipe section;
said inner pipe section being formed of a material capable of carrying substantially the entirety of the axial compressive loading on the corresponding pipe segment as the pipe segment is thrust axially along the passage;
said pipe segment having its outer pipe section terminating at one end short of the corresponding end of its inner pipe section;
the opposite end of said inner pipe section having a radially enlarged portion providing a radially enlarged interior pipe surface;
the outer surface of said outer pipe section being of substantially constant diameter throughout its length whereby the pipe segment presents a substantially constant diameter outline to the passage as the pipe is axially advanced through the passage.

22. A thrust pipe according to claim 21 wherein said inner pipe section is comprised of a ductile cast pipe and said outer pipe section is formed of concrete.

23. A thrust pipe according to claim 21 wherein said inner pipe section is comprised of a ductile cast pipe and said outer pipe section is formed of a layer of plastic foam.

24. A thrust pipe according to claim 21 wherein said opposite inner pipe section end and the opposite end of said outer pipe section terminate substantially in a common plane normal to the axis of said pipe segment.

25. A thrust pipe segment according to claim 21 wherein the length of the outer pipe section is less than the length of the inner pipe section by a dimension greater than the axial extent of the radial enlargement at said opposite end of said inner pipe.

* * * * *